(12) United States Patent
Balmakhtar et al.

(10) Patent No.: US 11,388,068 B1
(45) Date of Patent: Jul. 12, 2022

(54) SERVICE RECORD TRACKER NETWORK FUNCTION

(71) Applicant: T-MOBILE INNOVATIONS LLC, Overland Park, KS (US)

(72) Inventors: Marouane Balmakhtar, Fairfax, VA (US); Peter P. Dawson, Portsmouth, NH (US); Galip Murat Karabulut, Vienna, VA (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 66 days.

(21) Appl. No.: 17/076,389

(22) Filed: Oct. 21, 2020

(51) Int. Cl.
*G06F 15/173* (2006.01)
*H04L 41/5009* (2022.01)
*H04L 43/06* (2022.01)
*H04L 67/146* (2022.01)
*H04L 43/0882* (2022.01)
*G06F 9/54* (2006.01)
*G06F 16/23* (2019.01)
*H04L 67/51* (2022.01)
*H04L 9/40* (2022.01)
*H04W 84/04* (2009.01)

(52) U.S. Cl.
CPC .......... *H04L 41/5009* (2013.01); *G06F 9/541* (2013.01); *G06F 16/2379* (2019.01); *H04L 43/06* (2013.01); *H04L 43/0882* (2013.01); *H04L 67/146* (2013.01); *H04L 67/16* (2013.01); *H04L 63/0884* (2013.01); *H04W 84/042* (2013.01)

(58) Field of Classification Search
CPC . H04L 41/5009; H04L 43/06; H04L 43/0882; H04L 67/146; H04L 67/16; G06F 16/2379; G06F 9/541
USPC ......................................................... 709/224
See application file for complete search history.

(56) References Cited

U.S. PATENT DOCUMENTS

| 10,491,376 | B1 * | 11/2019 | Suthar | H04W 48/08 |
| 2020/0351650 | A1 * | 11/2020 | Maria | H04L 9/3297 |
| 2022/0007450 | A1 * | 1/2022 | Li | H04W 76/11 |

* cited by examiner

*Primary Examiner* — Duyen M Doan (57) ABSTRACT

A communication network service record tracker. The service record tracker comprises a processor, a data store comprising a plurality of service record blockchains, a non-transitory memory, and a service record tracker application stored in the non-transitory memory. When executed by the at least one processor, the application provides a service record tracker network function that receives notices of network events from other network function instances, in response to receiving a notice of a network event from a network function, invokes an API of the network function to request information about the network event, receives information about the network event, builds a block comprising the information about the network event, and adds the block to one of the plurality of service record blockchains in the data store, whereby the service record tracker application establishes and maintains an immutable service record of network communication events accessible by authorized communication network applications.

20 Claims, 8 Drawing Sheets

SERVICE RECORD TRACKER NETWORK FUNCTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Capturing information about network communication activities may involve identifying actions performed at different waypoints in a complicated interweaving of communication network paths. Network communication functions are typically carried out by network nodes that are, in effect, computers. The network communication functions in the future, for example in the 5G communication network, are expected to be performed not by dedicated special purpose platforms, such as home location registers (HLRs) or visitor location registers (VLRs), but by virtualized network functions (VNFs) that are instantiated on generic, low-cost computers on an as-needed dynamic basis. As the need for a VNF instance goes away, the instantiation of that VNF may be destroyed and the computer it had been executing upon may be repurposed to execute an instance of an entirely different VNF.

Edge computing refers to locating processing resources proximate to users of those processing resources. When a user accesses content it may be that the requested content can be successfully delivered in a broad range of time. If the user browser experiences a 5 second delay before presenting a social networking page, the user may not be dissatisfied. In this case, a user located in San Francisco may not notice a difference in performance between a social networking application server located in Lodi, Calif. and a social network application server located in Springfield, Mass. On the other hand, if the user is playing an interactive video game the content update requirements may be near real-time. In this case, the user laying the interactive video game may well discern a difference between a gaming application server located in Lodi, Calif. fulfilling game client requests versus a gaming application server located in Springfield, Mass. fulfilling the same game client requests. Edge computing can provide reduced latency for applications that desire low delays in service requests. The communication network linking the user device and the edge computing platform desirably is likewise proximate to the user. For example, the communication path is desirably from the user in San Francisco to a communication gateway in San Jose, to the application server in Lodi, back to the communication gateway in San Jose, and from the communication gateway to the user in San Francisco. This would be a preferred communication path rather than from the user in San Francisco to a communication gateway in Lexington, Ky., to the application server in Lodi, back to the communication gateway in Lexington, and from the communication gateway to the user in San Francisco.

SUMMARY

In an embodiment, a method of satisfying communication network data governance requirements is disclosed. The method comprises receiving a first event message identifying a packet data unit (PDU) session from a session management function (SMF) by a service record tracker network function (SRT) executing on a computer, sending a request for information about the PDU session by the SRT to the SMF, and receiving an information response by the SRT from the SMF comprising information about the PDU session that is at least one of a PDU session identity, a network edge application instance identity, a network edge application software version identity, a session anchor identity, an SMF instance identity, a network slice identity, and a user equipment identity. The method further comprises building a first block that comprises the information about the PDU session received from the SMF by the SRT adding the first block to a blockchain associated with the PDU session by the SRT. The method further comprises receiving a second event message identifying the PDU session from an access and mobility management function (AMF) by the SRT, sending a second request for information about the PDU session by the SRT to the AMF, and receiving a second information response by the SRT from the AMF comprising information about the PDU session that is at least one of a PDU session identity, a network edge application instance identity, a network edge application software version identity, a session anchor identity, an SMF instance identity, a network slice identity, and a user equipment identity. The method further comprises building a second block that comprises the information about the PDU session received from the AMF by the SRT and adding the second block to the blockchain associated with the PDU session by the SRT. The method further comprises auditing the blocks of a plurality of blockchains including the blockchain associated with the PDU session by a data governance compliance assurance application executing on a computer and determining a compliance of a communication network hosting the SRT network function, the SMF, the AMF, and the PDU session with data governance criteria by the data governance compliance assurance application based on auditing the blocks of the plurality of blockchains.

In another embodiment, a communication network service record tracker is disclosed. The communication network service tracker comprises an at least one processor, a data store comprising a plurality of service record blockchains, a non-transitory memory, and a service record tracker application stored in the non-transitory memory. When executed by the at least one processor, the service record tracker application provides a service record tracker network function that extends an application programing interface (API) to network functions instantiated in a communication network and receives notices of network events from network function instances via the API, and, in response to receiving a notice of a network event from a network function, invokes an API of the network function to request information about the network event. The service record tracker application further receives information about the network event, where the information comprises at least one of a PDU session identity, a network edge application instance identity, a network edge application software version identity, a session anchor identity, a network function instance identity, a network slice identity, and a user equipment identity, builds a block comprising the information about the network event, and adds the block to one of the plurality of service record blockchains in the data store, whereby the service record tracker application establishes and maintains an immutable service record of network communication events accessible by authorized communication network applications.

In yet another embodiment, a method of monitoring communication events in a 5G communication network is disclosed. The method comprises receiving a first event message identifying a packet data unit (PDU) session from a session management function (SMF) by a service record tracker network function (SRT) executing on a computer, sending a request for information about the PDU session by the SRT to the SMF, and receiving an information response by the SRT from the SMF comprising information about the PDU session that is at least one of a PDU session identity, a network edge application instance identity, a network edge application software version identity, a session anchor identity, an SMF instance identity, a network slice identity, and a user equipment identity. The method further comprises building a first block that comprises the information about the PDU session received from the SMF by the SRT and adding the first block to a blockchain associated with the PDU session by the SRT. The method further comprises receiving a second event message identifying the PDU session from an access and mobility management function (AMF) by the SRT, sending a second request for information about the PDU session by the SRT to the AMF and receiving a second information response by the SRT from the AMF comprising information about the PDU session that is at least one of a PDU session identity, a network edge application instance identity, a network edge application software version identity, a session anchor identity, an SMF instance identity, a network slice identity, and a user equipment identity. The method further comprises building a second block that comprises the information about the PDU session received from the AMF by the SRT and adding the second block to the blockchain associated with the PDU session by the SRT. The method further comprises reading the blocks of a plurality of blockchains including the blockchain associated with the PDU session and analyzing the information stored in the blocks read from the plurality of blockchains.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Monitoring and capturing communication network activity events in records for later analysis have become increasingly complicated and difficult as the communication networks have evolved. For example, the 5G communication networks, currently being built-out and implemented, provide communication services in a highly dynamic environment of virtual network functions executing on generic, low-cost computers where the mapping of network functions to specific computers changes over short durations of time. Recording network events in such a dynamic environment is a stiff challenge. The present disclosure teaches a particular technical solution to this technical challenge in the form of a service record tracker, a new network function that plugs into the services based architecture of the 5G communication network.

Packet data unit (PDU) sessions of a user are the basis of user communications in 5G network communications. A user may have two or more PDU sessions active concurrently. Network nodes that host or anchor these PDU sessions may change over time. The service record tracker will monitor PDU session creation events and PDU session partition events and create "snapshots" or records of those events. The information captured about these events may comprise both physical information and logical information about the PDU sessions. The service record tracker can register itself with the other network functions, for example with session management function (SMF) instances and access and mobility management function (AMF) instances, to obtain the control plane information it needs to learn of the network events that it records and stores. The network function may send an indication that a network event has occurred to the service record tracker, and the service record tracker may respond by requesting details of the subject network event to the network function. The network function may send the information about the network event to the service record tracker. The service record tracker can then record and store the information about the network event. For example, the service record tracker may store the event information in a record in a distributed ledger and/or a blockchain. The service record tracker can also provide services to network functions to create and store event records on their behalf.

This distributed ledger may extend a read-only access to other network functions and/or remote auditing applications (e.g., auditing applications executed on servers outside the purview of the communication network, for example an application function (AF)). Such remote auditing applications may take many forms. In an embodiment, one of the auditing applications may provide data governance compliance auditing, for example to demonstrate compliance with privacy requirements (e.g., general data privacy requirements (GDPR) imposed by the European Union (EU)) or to demonstrate compliance with restrictions of content distributed to minors (e.g., restricting pornographic content and/or advertisements for alcoholic beverages and for smoking materials). In an embodiment, one of the auditing applications may provide on-line gambling restriction compliance auditing. In an embodiment, one of the auditing applications may provide independent third party verification of communication service billing. The distributed ledger may extend a read-only access to a billing network function that generates monthly bills for post-paid communication service subscription accounts and/or that maintains an account balance of a pre-paid communication service subscription account. The distributed ledger may extend a read-only access to a troubleshooting application, for example a troubleshooting application accessible from a network operation center (NOC) dashboard to troubleshoot and repair network service outages or network service quality reductions.

Network event information that is recorded and stored by the service record tracker may comprise one or more of the following items: an edge application identity, an edge application instance identity, an edge application session identity, an edge application software version identity, an edge server rack identity, an edge server identity, an edge server virtual machine identity, an edge server container identity, a communication network session anchor identity, a communication network session management function (SMF) identity, a communication network access and mobility management function (AMF) identity, a network slice identity, and a user equipment (UE) (e.g., end device or terminal device) identity (e.g., a global unique temporary identity (GUTI) or subscriber permanent identity (SUPI).

In an embodiment, the service record tracker may be advantageously applied to tracking network edge communication events. Edge computing is anticipated to be important to 5G communication networks. Application service providers (e.g., third party enterprises that provide application computing services to UEs operated by video game enthusiasts or premium content subscribers) may pay communication service providers to execute their applications on computing nodes located at the edge of the network. Providing this edge computing, however, will present a variety of challenges to network operators. The service record tracker provides a flexible network function to track and record edge computing events, to store this information reliably, and to make this information auditable in shared data stores. One function that may be supported by the service record tracker is providing an auditable bread crumb trail of network event information stored in the distributed ledger or blockchain in the data store that can be audited to verify that edge applications adhere to terms and conditions of a service agreement with a communication service provider. For example, the communication service provider may provide an advantageous price point to an application service provider on the understanding that communication traffic generated by an edge application rarely transits the inner network and in fact remains in what may be referred to as the network edge. If, to the contrary, the edge application generates a significant amount of communication traffic that transits the inner network, the operation costs to the communication service provider are naturally greater, which may make their agreement with the application service provider untenable from a business point of view. An auditor application managed by the communication service provider can analyze the bread crumb trail of network event information associated with edge applications to determine if the terms and conditions of the service agreement are being adhered to by the edge applications and to seek redress if they are not being adhered to. Additionally, the immutable nature of the storage of the network event information in the distributed ledger or blockchain makes this same audit process transparent and trustworthy to application service providers who otherwise might object that the communication service provider is just ginning up false accusations. The storage of the network event information supports, for example, third parties conducting their own audits of the same information to cross-check the findings of the communication service provider.

Figure 1:
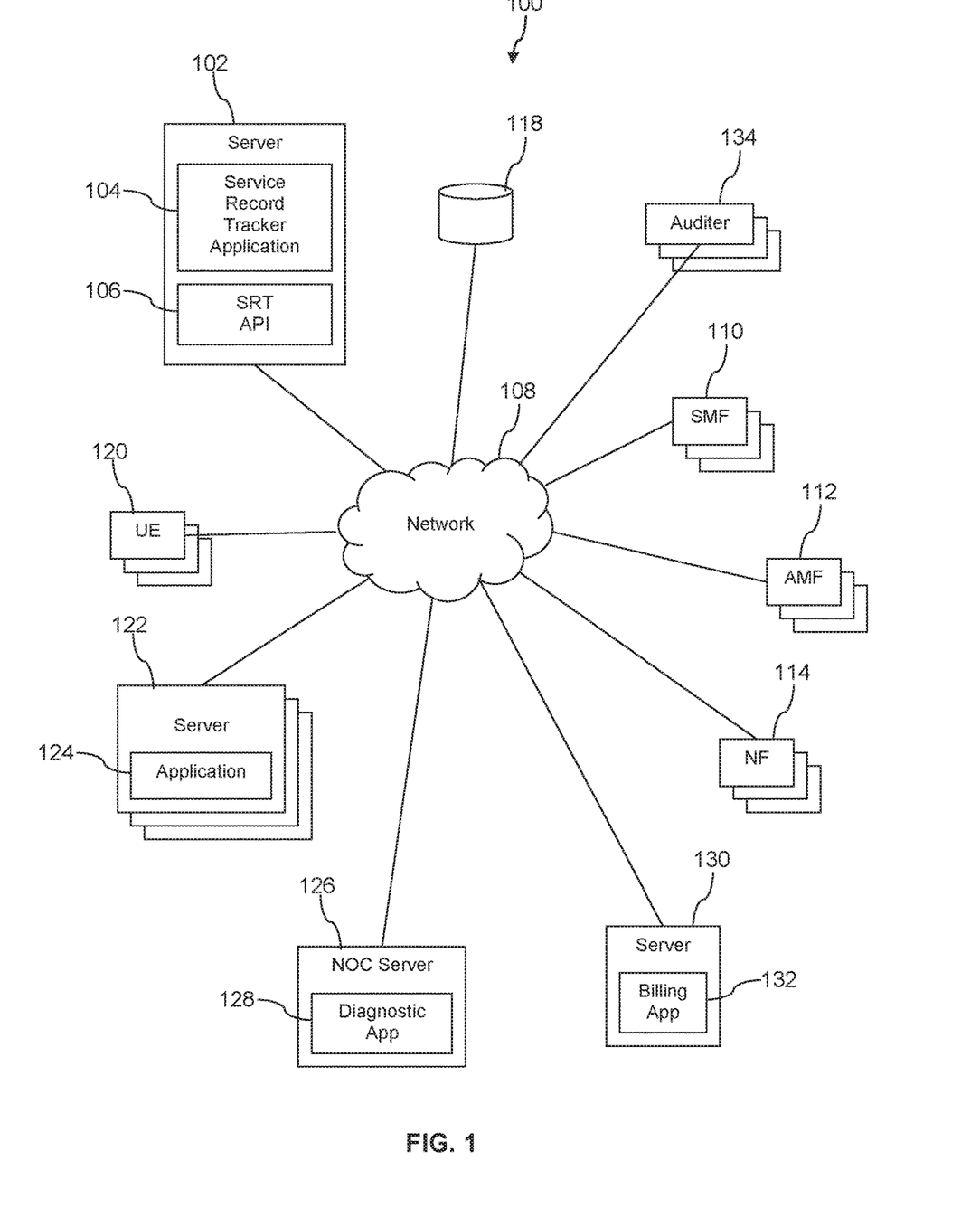
FIG. 1 is a block diagram of a communication system according to an embodiment of the disclosure.

Turning now to FIG. 1, a communication system 100 is described. In an embodiment, the system 100 comprises at least one server computer 102 that executes an instance of a service record tracker (SRT) network function 104 which itself executes or extends a service record tracker application programming interface (SRT API) 106. The server 102 is communicatively coupled to a network 108. In an embodiment, a plurality of instances of the SRT network function 104 and the SRT API 106 may be executed on the server computer 102. In an embodiment, a plurality of instances of the SRT network function 104 and of the SRT API 106 may be executed on a plurality of server computers 102. The communication system 100 may dynamically expand and contract the number of instances of the SRT network function 104 and of the SRT API 106 that are executed by the server computer(s) 102 as needs change. The SRT network function 104 may be referred to as the SRT 104 in some contexts herein.

In an embodiment, the system 100 further comprises a plurality of instances of a session management function (SMF) 110 executing on one or more server computers coupled to the network 108, a plurality of instances of an access and mobility management function (AMF) 112 executing on one or more server computers coupled to the network 108, and a plurality of other network functions (NF) 114 executing on one or more server computers coupled to the network 108. The network 108 comprises one or more private networks, one or more public networks, or a combination thereof. In an embodiment, the network 108 comprises a 5G network. A 5G core network portion of the network 108 may be considered to include the SMF 110, the AMF 112, and the NFs 114, but these artifacts are shown separately in FIG. 1 to promote more clear discussion of the interactions between the SRT 104 and these artifacts. 5G networks are described further hereinafter with reference to FIG. 4A and FIG. 4B.

The system 100 further comprises a plurality of user equipments (UEs) 120 and server computers 122 executing application instances 124. The UEs 120 may comprise mobile phones, smart phones, personal digital assistants (PDAs), wearable computers, headset computers, laptop computers, tablet computers, notebook computers, or Internet of things (IoT) devices. Some of the UEs 120 may be communicatively coupled to the network 108 by wireless communication links and others of the UEs 120 may be communicatively coupled to the network 108 by wired communication links. Some of the UEs 120 may be communicatively coupled to the network 108 sometimes by wireless communication link and, sometimes by wired communication links. Some of the servers 122 may operate in a network edge and may be said to be engaged in edge computing. The application instances may be gaming applications, Internet search applications, content serving applications, and/or other applications. As the UEs 120 establish communication sessions with each other, with the applications 124, or with other systems communication events occur in the network 108, in the SMF 110, in the AMF 112, in the NF 114, or in the servers 122.

The SRT 104 may register to or subscribe with the SMF 110, the AMF 112, and or the NF 114 to be notified of communication events that occur in the system 100. These network events comprise PDU session creation events, PDU session partition events, PDU session resource switch events (e.g., UE switching to use another edge application instance). These network events may comprise other events, such as domain name server (DNS) update events, application service consumption events, UE IP address or address prefix update events, edge application software update events, and other events. The notifications of network events may be sent by the SMF 110, the AMF 112, and/or the NF 114 to the SRT 104 via invoking the SRT API 106. When the SRT 104 learns of a network event, it may invoke an API of the SMF 110, the AMF 112, or the NF 114 that sent the notification and request further information about the network event. The SMF 110, the AMF 112, or the NF 114 may send a message in response to this information request comprising additional information about the network event. This information may comprise one or more of: a PDU session identity, a network edge application identity, a network edge application instance identity, a network edge application session identity, a network edge application software version identity, a network edge server rack identity, a network edge server identity, a network edge server virtual machine identity, a network edge server container identity, a communication network session anchor identity, a communication network session management function (SMF) instance identity, a communication network access and mobility management function (AMF) instance identity, a network function instance identity, a network slice identity, and a user equipment (UE) (e.g., end device or terminal device) identity (e.g., a global unique temporary identity (GUTI) or subscriber permanent identity (SUPI)). The information about the network event may comprise a quality indicator (QI), location information about a UE 120 associated with the PDU session, location information about a network edge application instance, a date and time, and/or a data volume. In an embodiment, the information about the network event may comprise quality of service (QoS) flow information, 5QI information (e.g., a scalar value used to reference 5G QoS characteristics), and/or address resolution protocol (ARP) information.

The SRT 104 takes the information about information events, encapsulates the information in a block, and stores the block on a blockchain in a data store 118. In an embodiment, there is a blockchain associated with each PDU session. In an embodiment, there is a blockchain associated with each UE 120 and the newly created block is stored on the blockchain associated with the subject PDU session. In an embodiment, there is a blockchain for each SMF 110, AMF 112, and NF 114, and the newly created block is stored on the associated blockchain. Each block of a blockchain, except the first block, may comprise a hash of a previous block in the blockchain, data content (e.g., information about the network event), a nonce, and a hash of the block itself calculated over the hash of the previous block, the data content, and the nonce. Storing the information about information events in the blockchain may be deemed to make the store of information events immutable or tamperproof. Storing the information about information events in the blockchain can also make the information events accessible to other applications and/or third parties through an application programming interface (API) extended by the data store 118, where this API controls such access to protect the integrity of the blockchain as well as properly restrict access to possibly sensitive information associated with the information events.

The system 100 may further comprise a diagnostic application 128 that executes on a server operated by a communication service provider, for example on a network operations center (NOC) server 126. The diagnostic application 128 may provide troubleshooting and diagnostic services to NOC personnel. The diagnostic application 128 may be authorized to access the data store 118 on a read only basis to read information from the blockchains stored in the data store 118. Since the blockchains store a great deal of information about network events, the diagnostic application 128 can comb through the blocks that it reads from the blockchains stored in the data store 118 and learn much about potential causes of communication network faults. In an embodiment, the diagnostic application 128 may provide capabilities other than troubleshooting, for example monitoring network availability, network throughput, network latency, network jitter, and other key performance indicators and reflect a rolled-up view of these factors in a dashboard for NOC personnel to use. Part of the troubleshooting analysis may involve analyzing network settings indicated in the event records to assure compliance with standard network settings. If a setting is noncompliant that could be a likely pain point, and remedying the trouble may be as simple as changing the subject setting to agree with standard network settings.

The system 100 may further comprise a server 130 that executes a billing application 132. The billing application 132 may be able to access the data store 118 on a read only basis to read from the blockchains stored in the data store 118. By accessing the information in the blockchains, the billing application 132 may be able to generate monthly bills of post-paid service subscribers and to update account balances of pre-paid service subscribers. By accessing the information in the blockchains, the billing application 132 may be able to generate billings for servers 122.

The system 100 may further comprise one or more auditing platforms or applications 134. The auditing platform 134 may be referred to as an auditor in some contexts. The auditing platform 134 may be able to access the data store 118 on a read only basis to read from the blockchains stored in the data store 118. The auditing platform 134 may examine the records of network events stored in the blockchains to evaluate and/or verify compliance with regulations, laws, or policies. For example, one of the auditing platforms may verify compliance with privacy requirements such as GDPR. For example, one of the auditing platforms may verify compliance with restrictions on content distributed to minors. For example, one of the auditing platforms may verify compliance with on-line gambling restrictions.

Figure 2A:
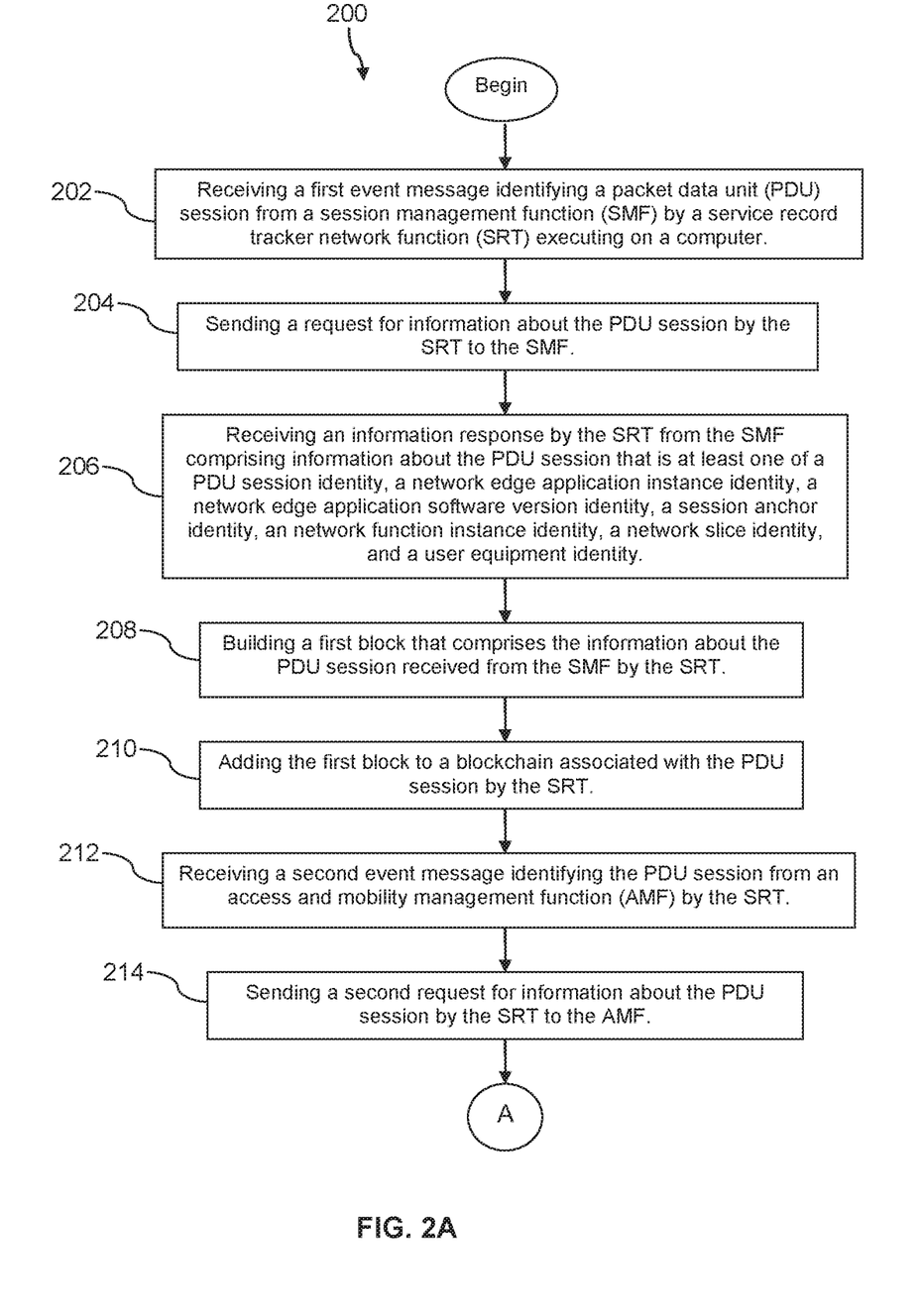
FIG. 2A and FIG. 2B are flow charts of a method according to an embodiment of the disclosure.
Figure 2B:
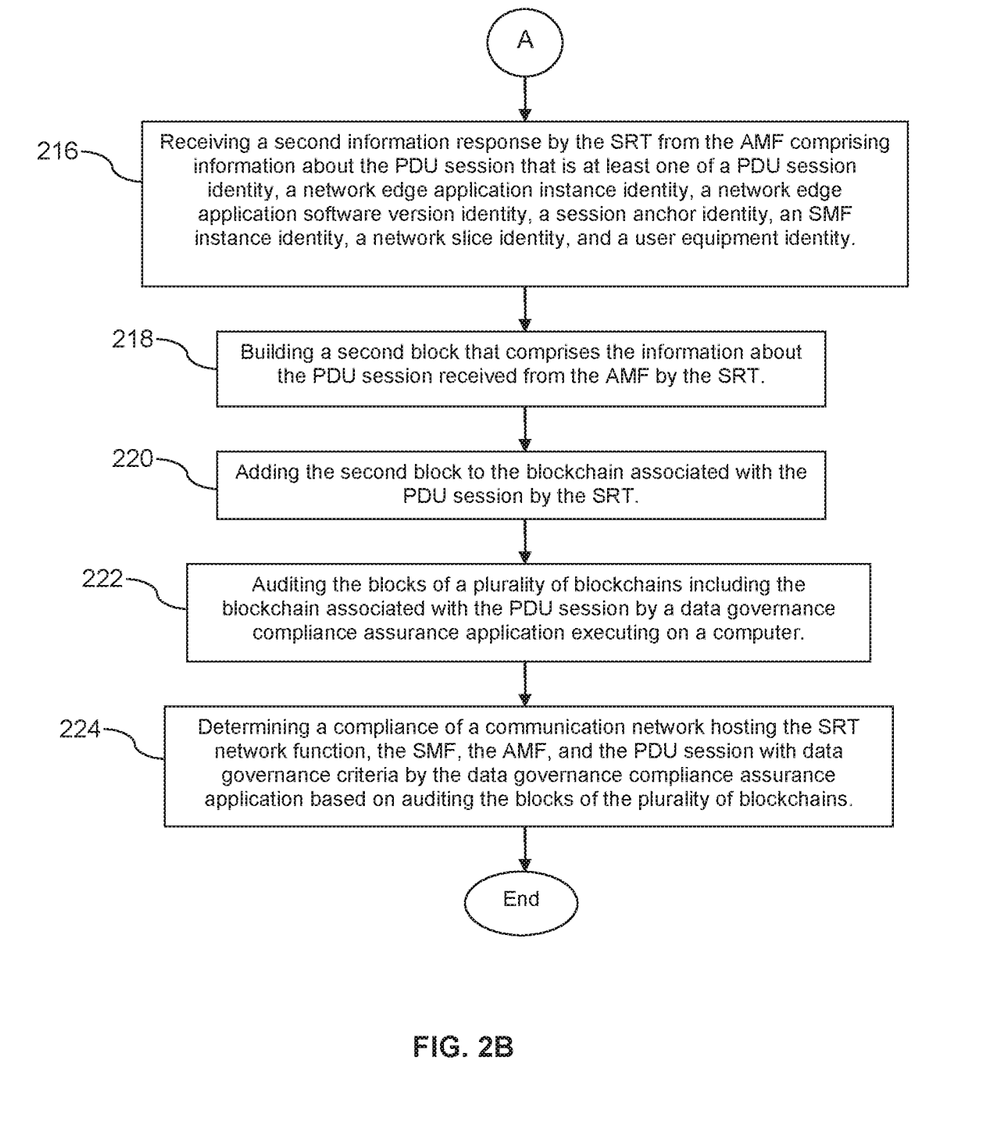

Turning now to FIG. 2A and FIG. 2B, a method 200 is described. In an embodiment, the method 200 is a method of satisfying communication network data governance requirements. At block 202, the method 200 comprises receiving a first event message identifying a packet data unit (PDU) session from a session management function (SMF) by a service record tracker network function (SRT) executing on a computer. At block 204, the method 200 comprises sending a request for information about the PDU session by the SRT to the SMF. At block 206, the method 200 comprises receiving an information response by the SRT from the SMF comprising information about the PDU session that is at least one of a PDU session identity, a network edge application instance identity, a network edge application software version identity, a session anchor identity, an SMF instance identity, a network slice identity, and a user equipment identity. In an embodiment, the information response may comprise a quality indicator (QI). In an embodiment, the information response may comprise location information about a UE associated with the PDU session. In an embodiment, the information response may comprise location information about a network edge application instance. In an embodiment, the information response may comprise a date and time. In an embodiment, the information response may comprise a data volume.

At block 208, the method 200 comprises building a first block that comprises the information about the PDU session received from the SMF by the SRT. At block 210, the method 200 comprises adding the first block to a blockchain associated with the PDU session by the SRT.

At block 212, the method 200 comprises receiving a second event message identifying the PDU session from an access and mobility management function (AMF) by the SRT. At block 214, the method 200 comprises sending a second request for information about the PDU session by the SRT to the AMF. At block 216, the method 200 comprises receiving a second information response by the SRT from the AMF comprising information about the PDU session that is at least one of a PDU session identity, a network edge application instance identity, a network edge application software version identity, a session anchor identity, an SMF instance identity, a network slice identity, and a user equipment identity. In an embodiment, the second information response may comprise a quality indicator (QI). In an embodiment, the second information response may comprise location information about a UE associated with the PDU session. In an embodiment, the second information response may comprise location information about a network edge application instance. In an embodiment, the second information response may comprise a date and time. In an embodiment, the second information response may comprise a data volume.

At block 218, the method 200 comprises building a second block that comprises the information about the PDU session received from the AMF by the SRT. At block 220, the method 200 comprises adding the second block to the blockchain associated with the PDU session by the SRT.

At block 222, the method 200 comprises auditing the blocks of a plurality of blockchains including the blockchain associated with the PDU session by a data governance compliance assurance application executing on a computer. At block 224, the method 200 comprises determining a compliance of a communication network hosting the SRT network function, the SMF, the AMF, and the PDU session with data governance criteria by the data governance compliance assurance application based on auditing the blocks of the plurality of blockchains. In an embodiment, the method 200 further comprises receiving a third event message identifying a packet data unit (PDU) session from a network function (NF) by the SRT, wherein the NF is one of an authentication server function (AUSF), a network exposure function (NEF), a network repository function (NRF), a policy control function (PCF), a unified data management (UDM), and a network slice selection function (NSSF). In an embodiment, the method 200 further comprises sending a third request for information about the PDU session by the SRT to the NF, receiving a third information response by the SRT from the NF comprising information about the PDU session, building a third block that comprises the information about the PDU session received from the NF by the SRT, and adding the third block to the blockchain associated with the PDU session by the SRT.

Figure 3A:
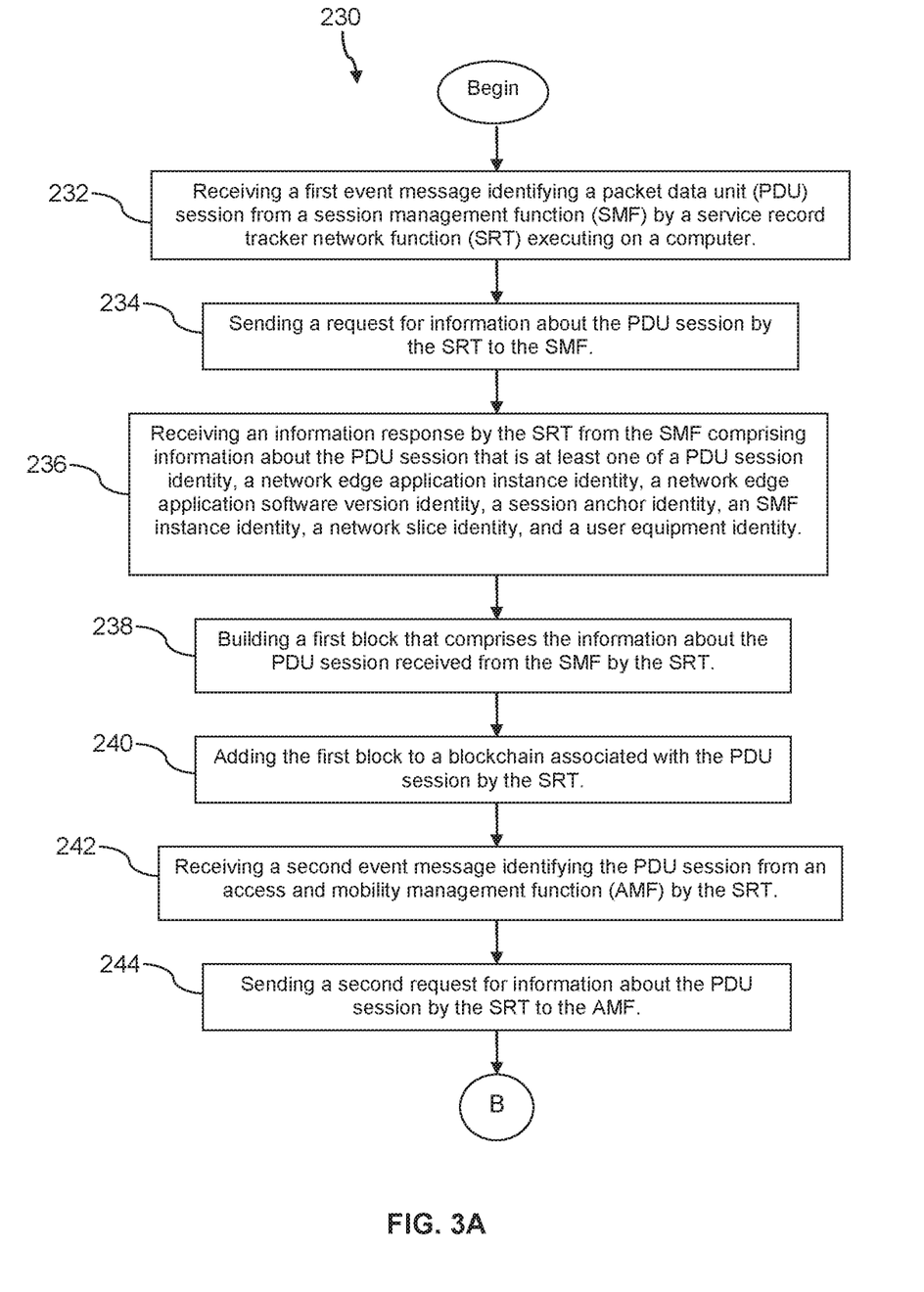
FIG. 3A and FIG. 3B are flow charts of another method according to an embodiment of the disclosure.
Figure 3B:
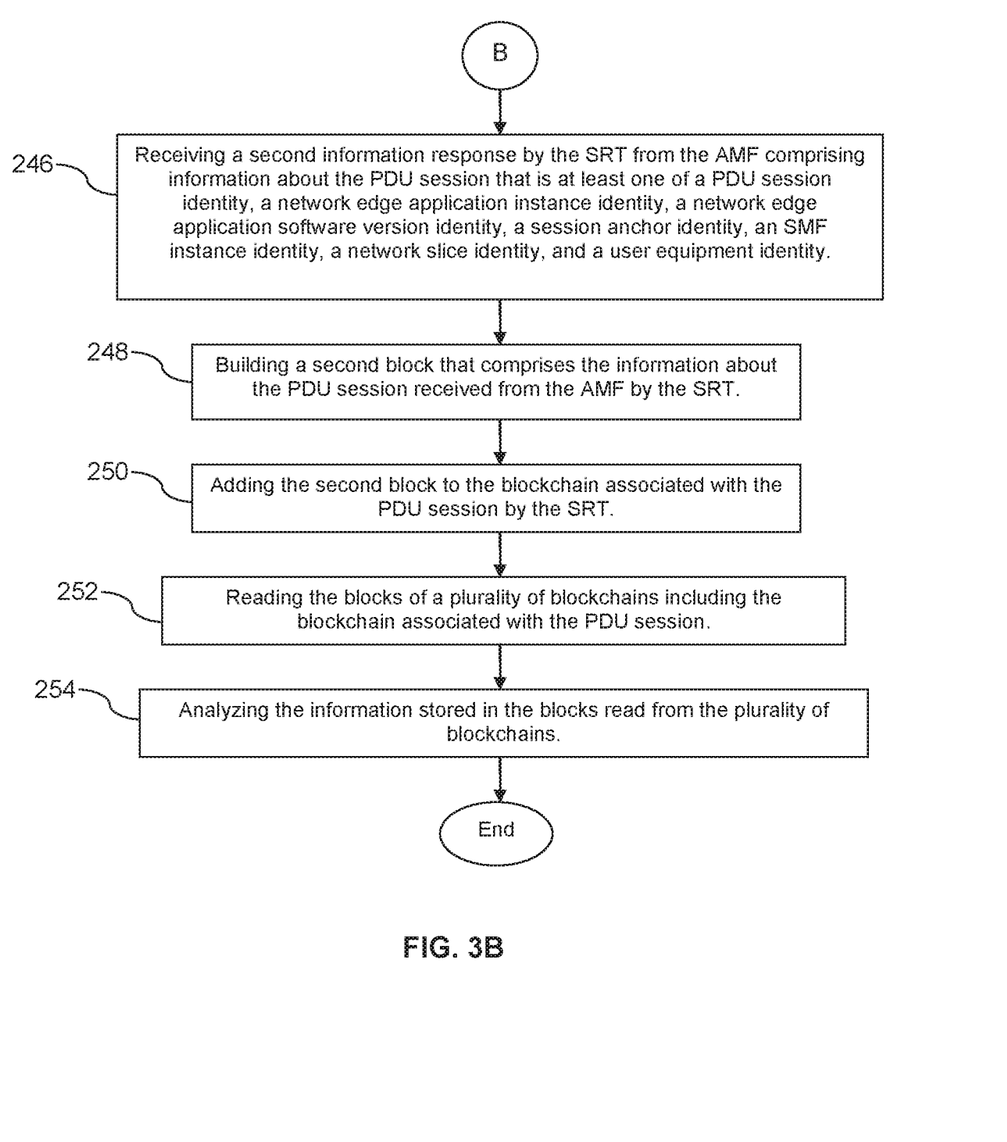

Turning now to FIG. 3A and FIG. 3B, a method 230 is described. In an embodiment, the method 230 is a method of monitoring communication events in a 5G communication network. At block 232, the method 230 comprises receiving a first event message identifying a packet data unit (PDU) session from a session management function (SMF) by a service record tracker network function (SRT) executing on a computer. At block 234, the method 230 comprises sending a request for information about the PDU session by the SRT to the SMF. In an embodiment, the information response may comprise a data volume. In an embodiment, the SRT knows to which SMF instance, among a plurality of SMF instances active in the 5G communication network at one time, to send the request for information. The SMF instance coordinates PDU sessions and QoS flow setup and release for UEs.

At block 236, the method 230 comprises receiving an information response by the SRT from the SMF comprising information about the PDU session that is at least one of a PDU session identity, a network edge application instance identity, a network edge application software version identity, a session anchor identity, an SMF instance identity, a network slice identity, and a user equipment identity. In an embodiment, the information response may comprise a quality indicator (QI). In an embodiment, the information response may comprise location information about a UE associated with the PDU session. In an embodiment, the information response may comprise location information about a network edge application instance. In an embodiment, the information response may comprise a date and time. In an embodiment, the SRT stiches information it receives in the information response from the SMF together with other information it may know about an edge application function, network slice, etc., to provide a big picture view greater than the view provided solely by what the SMF provides in the information response.

At block 238, the method 230 comprises building a first block that comprises the information about the PDU session received from the SMF by the SRT. At block 240, the method 230 comprises adding the first block to a blockchain associated with the PDU session by the SRT.

At block 242, the method 230 comprises receiving a second event message identifying the PDU session from an access and mobility management function (AMF) by the SRT. At block 244, the method 230 comprises sending a second request for information about the PDU session by the SRT to the AMF. At block 246, the method 230 comprises receiving a second information response by the SRT from the AMF comprising information about the PDU session that is at least one of a PDU session identity, a network edge application instance identity, a network edge application software version identity, a session anchor identity, an SMF instance identity, a network slice identity, and a user equipment identity. In an embodiment, the second information response may comprise a quality indicator (QI). In an embodiment, the second information response may comprise location information about a UE associated with the PDU session. In an embodiment, the second information response may comprise location information about a network edge application instance. In an embodiment, the second information response may comprise a date and time. In an embodiment, the second information response may comprise a data volume.

At block 248, the method 230 comprises building a second block that comprises the information about the PDU session received from the AMF by the SRT. At block 250, the method 230 comprises adding the second block to the blockchain associated with the PDU session by the SRT.

At block 252, the method 230 comprises reading the blocks of a plurality of blockchains including the blockchain associated with the PDU session. At block 254, the method 230 comprises analyzing the information stored in the blocks read from the plurality of blockchains. In an embodiment, the reading the blocks of a plurality of blockchains and analyzing the information stored in the blocks is performed by a billing application. In an embodiment, the reading the blocks of a plurality of blockchains and analyzing the information stored in the blocks is performed by a general data privacy requirements (GDPR) auditing application. In an embodiment, the reading the blocks of a plurality of blockchains and analyzing the information stored in the blocks is performed by a network communication troubleshooting application.

Figure 4A:
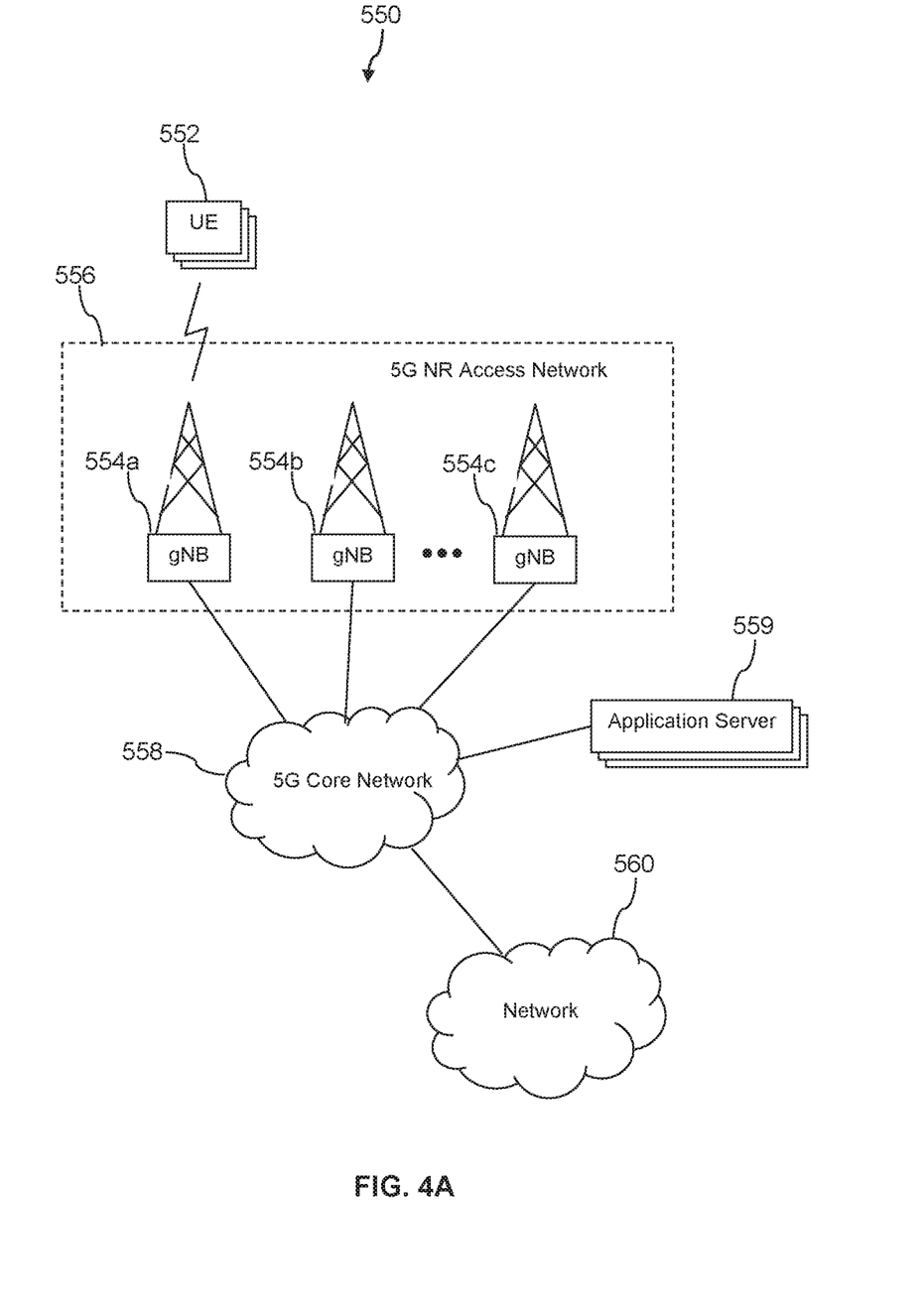
FIG. 4A and FIG. 4B are block diagrams of a 5G communication network according to an embodiment of the disclosure.

Turning now to FIG. 4A, an exemplary communication system 550 is described. In an embodiment, the system 100 described above with reference to FIG. 1 above may be substantially similar to the communication system 550 described with reference to FIG. 4A and FIG. 4B below. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 4B:
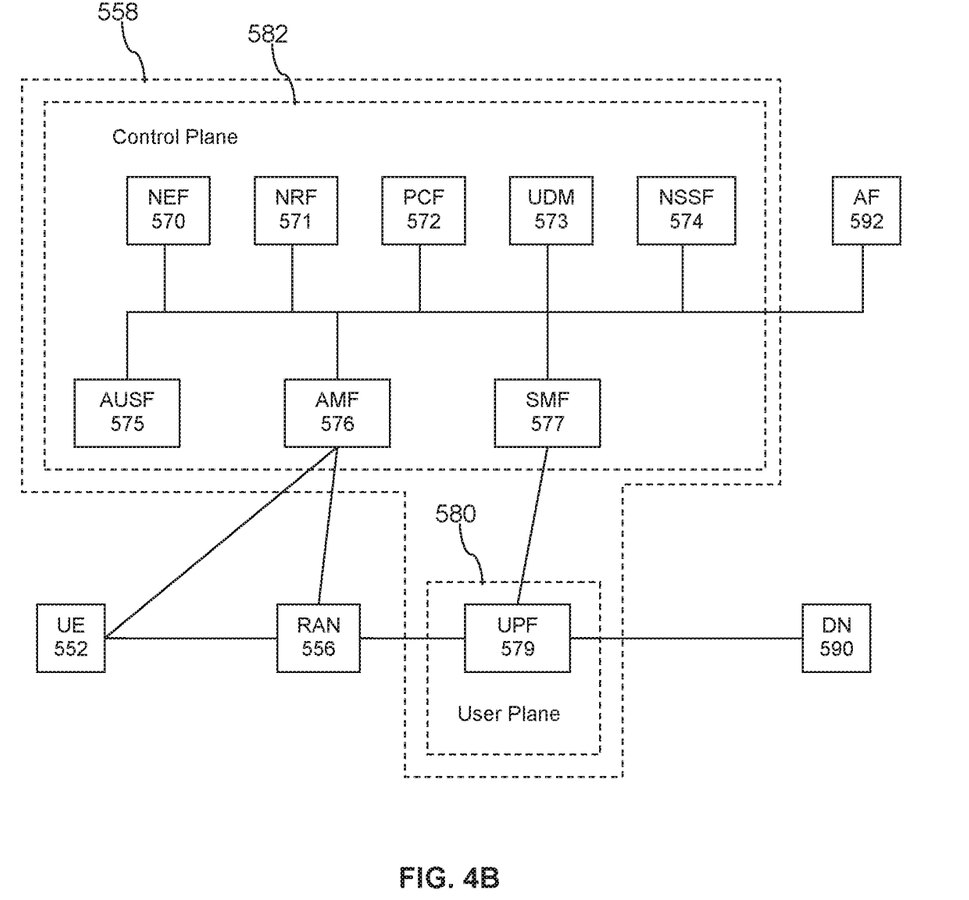

Turning now to FIG. 4B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access node 554, to a data network 590 (e.g., the network 560 illustrated in FIG. 4A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 5:
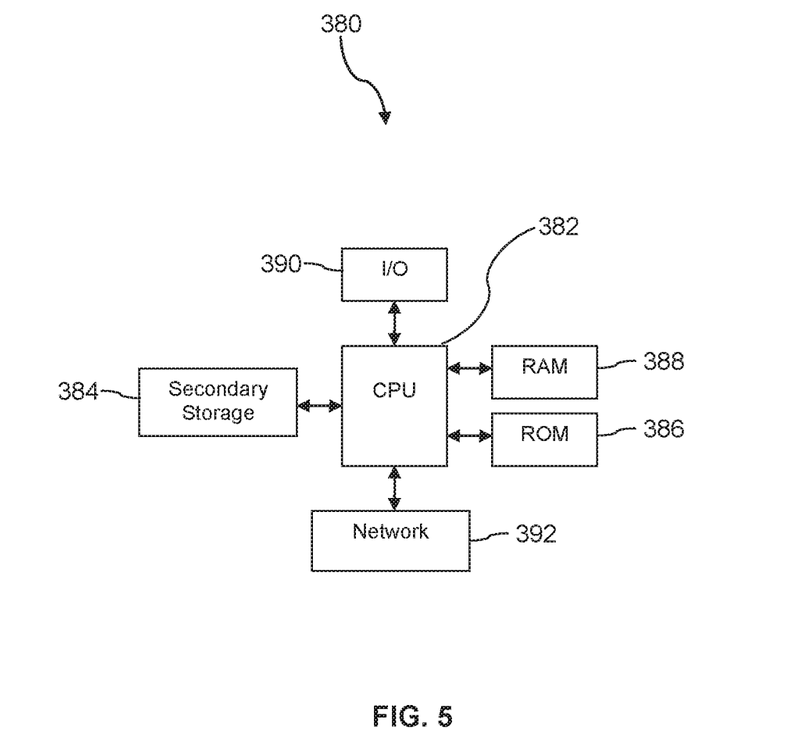
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of satisfying communication network data governance requirements, comprising:
    receiving a first event message identifying a packet data unit (PDU) session from a session management function (SMF) by a service record tracker network function (SRT) executing on a computer;
    sending a request for information about the PDU session by the SRT to the SMF;
    receiving an information response by the SRT from the SMF comprising information about the PDU session that is at least one of a PDU session identity, a network edge application instance identity, a network edge application software version identity, a session anchor identity, a SMF instance identity, a network slice identity, and a user equipment identity;
    building a first block that comprises the information about the PDU session received from the SMF by the SRT;
    adding the first block to a blockchain associated with the PDU session by the SRT;
    receiving a second event message identifying the PDU session from an access and mobility management function (AMF) by the SRT;
    sending a second request for information about the PDU session by the SRT to the AMF;
    receiving a second information response by the SRT from the AMF comprising information about the PDU session that is at least one of a PDU session identity, a network edge application instance identity, a network edge application software version identity, a session anchor identity, an SMF instance identity, a network slice identity, and a user equipment identity;
    building a second block that comprises the information about the PDU session received from the AMF by the SRT;
    adding the second block to the blockchain associated with the PDU session by the SRT;
    auditing blocks of a plurality of blockchains including the blockchain associated with the PDU session by a data governance compliance assurance application executing on a remote computer; and
    determining a compliance of a communication network hosting the SRT network function, the SMF, the AMF, and the PDU session with data governance criteria by the data governance compliance assurance application based on auditing the blocks of the plurality of blockchains.

2. The method of claim 1, wherein the information response or the second information response comprises a quality indicator (QI).

3. The method of claim 1, wherein the information response or the second information response comprises location information of a user equipment (UE) associated with the PDU session.

4. The method of claim 1, wherein the information response or the second information response comprises location information about a network edge application instance.

5. The method of claim 1, wherein the information response or the second information response comprises a date and time.

6. The method of claim 1, wherein the information response or the second information response comprises a data volume.

7. The method of claim 1, further comprising:
receiving a third event message identifying a packet data unit (PDU) session from a network function (NF) by the SRT, wherein the NF is one of an authentication server function (AUSF), a network exposure function (NEF), a network repository function (NRF), a policy control function (PCF), a unified data management (UDM), and a network slice selection function (NSSF);
sending a third request for information about the PDU session by the SRT to the NF;
receiving a third information response by the SRT from the NF comprising information about the PDU session;
building a third block that comprises the information about the PDU session received from the NF by the SRT; and
adding the third block to the blockchain associated with the PDU session by the SRT.

8. A communication network service record tracker, comprising:
an at least one processor;
a data store comprising a plurality of service record blockchains;
a non-transitory memory; and
a service record tracker application stored in the non-transitory memory that, when executed by the at least one processor, provides a service record tracker network function that extends an application programing interface (API) to network functions instantiated in a communication network and
receives notices of network events from network function instances via the API,
in response to receiving a notice of a network event from a network function, invokes an API of the network function to request information about the network event,
receives information about the network event, where the information comprises at least one of a PDU session identity, a network edge application instance identity, a network edge application software version identity, a session anchor identity, a network function instance identity, a network slice identity, and a user equipment identity,
builds a block comprising the information about the network event, and
adds the block to one of the plurality of service record blockchains in the data store,
whereby the service record tracker application establishes and maintains an immutable service record of network communication events accessible by authorized communication network applications.

9. The communication service record tracker of claim 8, wherein the network function is one of a session management function (SMF), an access and mobility management function (AMF), an authentication server function (AUSF), a network exposure function (NEF), a network repository function (NRF), a policy control function (PCF), a unified data management (UDM), and a network slice selection function (NSSF).

10. The communication service record tracker of claim 8, wherein one of the authorized communication network applications is a communication service billing application.

11. The communication service record tracker of claim 8, wherein one of the authorized communication network applications is a data compliance auditing application.

12. The communication service record tracker of claim 8, wherein one of the authorized communication network applications is a network operation center (NOC) troubleshooting application.

13. The communication service record tracker of claim 8, wherein the communication network is a 5G communication network.

14. The communication service record tracker of claim 8, wherein the information about the network event comprises a quality indicator (QI).

15. A method of monitoring communication events in a 5G communication network, comprising:
receiving a first event message identifying a packet data unit (PDU) session from a session management function (SMF) by a service record tracker network function (SRT) executing on a computer;
sending a request for information about the PDU session by the SRT to the SMF;
receiving an information response by the SRT from the SMF comprising information about the PDU session that is at least one of a PDU session identity, a network edge application instance identity, a network edge application software version identity, a session anchor identity, an SMF instance identity, a network slice identity, and a user equipment identity;
building a first block that comprises the information about the PDU session received from the SMF by the SRT;
adding the first block to a blockchain associated with the PDU session by the SRT;
receiving a second event message identifying the PDU session from an access and mobility management function (AMF) by the SRT;
sending a second request for information about the PDU session by the SRT to the AMF;
receiving a second information response by the SRT from the AMF comprising information about the PDU session that is at least one of a PDU session identity, a network edge application instance identity, a network edge application software version identity, a session anchor identity, an SMF instance identity, a network slice identity, and a user equipment identity;
building a second block that comprises the information about the PDU session received from the AMF by the SRT;
adding the second block to the blockchain associated with the PDU session by the SRT;
reading blocks of a plurality of blockchains including the blockchain associated with the PDU session; and
analyzing the information stored in the blocks read from the plurality of blockchains.

16. The method of claim 15, wherein reading the blocks of a plurality of blockchains and analyzing the information stored in the blocks is performed by a billing application.

17. The method of claim 15, wherein reading the blocks of a plurality of blockchains and analyzing the information stored in the blocks is performed by a general data privacy requirements (GDPR) auditing application.

18. The method of claim 15, wherein reading the blocks of a plurality of blockchains and analyzing the information stored in the blocks is performed by a network communication troubleshooting application.

19. The method of claim 15, wherein the information response and the second information response comprise a data and time.

20. The method of claim 15, wherein the information response or the second information response comprises location information.

\* \* \* \* \*